(12) United States Patent
Olson

(10) Patent No.: US 7,140,670 B2
(45) Date of Patent: Nov. 28, 2006

(54) INTERCONNECTION SYSTEM FOR OVERHEAD FRAME STRUCTURES

(75) Inventor: Troy Erik Olson, Cold Spring, MN (US)

(73) Assignee: Custom Products of Litchfield, Litchfield, MN (US)

(*) Notice: Subject to any disclaimer, the term of this patent is extended or adjusted under 35 U.S.C. 154(b) by 0 days.

(21) Appl. No.: 10/645,867

(22) Filed: Aug. 19, 2003

(65) Prior Publication Data

US 2005/0040673 A1 Feb. 24, 2005

(51) Int. Cl.
*B62D 33/06* (2006.01)
*B60R 21/13* (2006.01)
*B62D 25/06* (2006.01)

(52) U.S. Cl. .......................... 296/190.08; 296/193.12; 296/203.01; 296/210; 280/756

(58) Field of Classification Search ................ 296/29, 296/103, 104, 185.1, 187.13, 190.03, 193.12, 296/193.02, 210, 203.01, 218; 280/756; 52/284, 79.12, 86; 135/88.09
See application file for complete search history.

(56) References Cited

U.S. PATENT DOCUMENTS

| | | | | |
|---|---|---|---|---|
| 4,135,756 A | * | 1/1979 | Hausmann | 296/190.03 |
| 4,136,985 A | | 1/1979 | Taul | |
| 4,291,510 A | * | 9/1981 | Sivachenko | 52/91.3 |
| 4,795,188 A | * | 1/1989 | Dueker | 280/756 |
| 4,883,310 A | * | 11/1989 | Miyazaki et al. | 296/210 |
| 4,949,991 A | | 8/1990 | Ludwig | |
| 5,018,781 A | | 5/1991 | Kumasaka et al. | |
| 5,064,242 A | | 11/1991 | Fujan et al. | |
| 5,150,942 A | | 9/1992 | Fujan et al. | |
| 5,226,696 A | * | 7/1993 | Klages et al. | 296/203.01 |
| 5,273,340 A | | 12/1993 | Nelson et al. | |
| 5,280,955 A | * | 1/1994 | Nelson et al. | 280/756 |
| 5,388,844 A | | 2/1995 | Pellegrini et al. | |
| 5,503,430 A | | 4/1996 | Miki et al. | |
| 5,586,784 A | | 12/1996 | Mast et al. | |
| 5,622,382 A | * | 4/1997 | Zepnik et al. | 280/756 |
| 5,630,622 A | | 5/1997 | Kirschenmann et al. | |
| 5,636,867 A | | 6/1997 | McNabb et al. | |
| 5,730,304 A | * | 3/1998 | Duncan | 212/180 |
| 5,829,219 A | * | 11/1998 | Sugawara et al. | 52/653.2 |
| 6,149,228 A | * | 11/2000 | O'Neill et al. | 296/190.03 |
| 6,189,955 B1 | | 2/2001 | Fryk et al. | |
| 6,209,949 B1 | * | 4/2001 | Sakyo et al. | 296/190.08 |
| 6,241,310 B1 | * | 6/2001 | Patelczyk | 296/205 |

(Continued)

OTHER PUBLICATIONS

Brochure, Custom Products of Litchfield, Inc., Cozy Cab, Cozy Sunshade Model A-1103 to fit John Deer Gator (Turf Gator & 4×2).

(Continued)

*Primary Examiner*—D. Glenn Dayoan
*Assistant Examiner*—Greg Blankenship
(74) *Attorney, Agent, or Firm*—Fredrikson & Byron, P.A.

(57) ABSTRACT

The invention provides an apparatus and method for providing an overhead frame structure having two side frame members each with at least one protrusion and one or more cross members coupling the side frame members through interconnection with the protrusions. Each protrusion has a corrugated configuration. Each cross member has end portions each having a wall with corrugated configuration. Each wall is adapted to engage one of the protrusions. The end portions in each cross member are adapted to receive one of the pairs of opposing protrusions therein. The cross members are coupled between the side frame members with the engagement and subsequent securing of the protrusions to the end portions of the cross members.

30 Claims, 6 Drawing Sheets

U.S. PATENT DOCUMENTS

| | | |
|---|---|---|
| 6,315,326 B1 | 11/2001 | Muller et al. |
| 6,374,935 B1 | 4/2002 | Kirschenmann et al. |
| 6,402,220 B1 * | 6/2002 | Allen ........................ 296/77.1 |
| 6,419,304 B1 * | 7/2002 | Richardson et al. ... 296/190.03 |
| 6,427,795 B1 | 8/2002 | Johnson et al. |
| 6,517,111 B1 | 2/2003 | Mizuta |
| 6,582,010 B1 * | 6/2003 | Sakyo et al. ........... 296/190.08 |

OTHER PUBLICATIONS

Brochure, Polaris Professional Series, Workmobiles UTV, PTV, ASL (pp. 1-23).

Postcard, Custom Products of Litchfield, Inc.; Cabs Roll-Bars & Enclosures.

* cited by examiner ature, the structure may be utilized to protect an operator from injury in the event of accidental upset or inadvertent rollover of the vehicle. Additionally, the structure may be used for mounting various accessories thereto. Further, the structure may be used as a framework to mount cab elements thereto.

INTERCONNECTION SYSTEM FOR OVERHEAD FRAME STRUCTURES

TECHNICAL FIELD

The invention relates to overhead frame structures utilized on vehicles, and in particular, to overhead frame structures which are composed of a plurality of members.

BACKGROUND OF THE INVENTION

Overhead frame structures are typically fabricated of various members assembled to form a framework. Such structures may be used on a vehicle for one or more reasons. The structure may be utilized to protect an operator from injury in the event of accidental upset or inadvertent rollover of the vehicle. Additionally, the structure may be used for mounting various accessories thereto. Further, the structure may be used as a framework to mount cab elements thereto.

While mounting an overhead frame structure on a vehicle may be advantageous for a variety of reasons, certain situations may exist in which one would want to lower the structure from the vehicle. For example, the vehicle may be used in low overhead clearance areas, in which the process of maneuvering the vehicle having the overhead frame structure is made much more difficult. As a result, certain overhead frame structures have been designed to be adjustable in height. In addition, other overhead frame structures have been configured (e.g., on tractors) to have an upper part of the structure pivotally connected to a lower part. As such, the upper part can be rotated downward after releasing an arresting device, thereby reducing the height of the vehicle.

Other applications may exist in which one would want to remove the overhead frame structure from the vehicle. For example, when one is shipping or transporting the vehicle, if the overhead frame structure can be removed, a smaller shipping volume may be utilized which would, in turn, reduce shipping costs. As mentioned above, a number of support members are generally fastened together to form the overhead frame structure for a vehicle. As such, if these overhead frame structures may also be disassembled before shipping, an even smaller shipping volume could be utilized. The members of the overhead frame structures can be interconnected in a variety of different fashions. It is an aim of this invention to provide an interconnection system for such structures that minimizes tooling costs, maximizes aesthetic appearance, simplifies fabrication of the members, and enables easy disassembly and separation from the vehicle at any time.

SUMMARY OF THE INVENTION

According to a first aspect of the invention, there is provided an overhead frame structure. The structure comprises two spaced-apart side frame members, one or more cross members, and fasteners. Each side frame member has at least one protrusion, wherein each protrusion on one side frame member extends toward an opposing protrusion on the other side frame member. Each protrusion has segments extending longitudinally thereof, wherein the segments provide each protrusion with a corrugated configuration. Each cross member extends between a pair of opposing protrusions and has end portions adapted for receiving said pair of opposing protrusions therein. Each end portion has a wall having segments extending longitudinally thereof. The segments provide each wall with a corrugated configuration. Each wall engages one of said pair of opposing protrusions. The fasteners releasably secure said cross member end portions to said protrusions.

According to a second aspect of the invention, there is provided a method of assembling members of an overhead frame structure. The method comprises providing two side frame members each having at least one protrusion, wherein each protrusion on one side frame member extends toward an opposing protrusion on the other side frame member. Each protrusion has segments extending longitudinally thereof, wherein the segments provide each protrusion with a corrugated configuration. One or more cross members are provided. Each cross member has end portions adapted for receiving one pair of opposing protrusions therein. Each end portion has a wall having segments extending longitudinally thereof. The segments provide each wall with a corrugated configuration. Each of the cross members are interconnected with one of the pairs of opposing protrusions of the side frame members such that the protrusions are received within the end portions of the cross members and the walls of the end portions engage with the protrusions. Said cross member end portions are secured to said protrusions.

According to a third aspect of the invention, there is provided a method of supplying an overhead frame structure. The method comprises providing two side frame members each having at least one protrusion, wherein each protrusion on one side frame member extends toward an opposing protrusion on the other side frame member. Each protrusion has segments extending longitudinally thereof, wherein the segments provide each protrusion with a corrugated configuration. One or more cross members are provided. Each cross member has end portions adapted for receiving one pair of opposing protrusions therein. Each end portion has a wall having segments extending longitudinally thereof. The segments provide each wall with a corrugated configuration. The side frame members and cross members are shipped.

DETAILED DESCRIPTION OF THE PREFERRED EMBODIMENTS OF THE INVENTION

Figure 1:
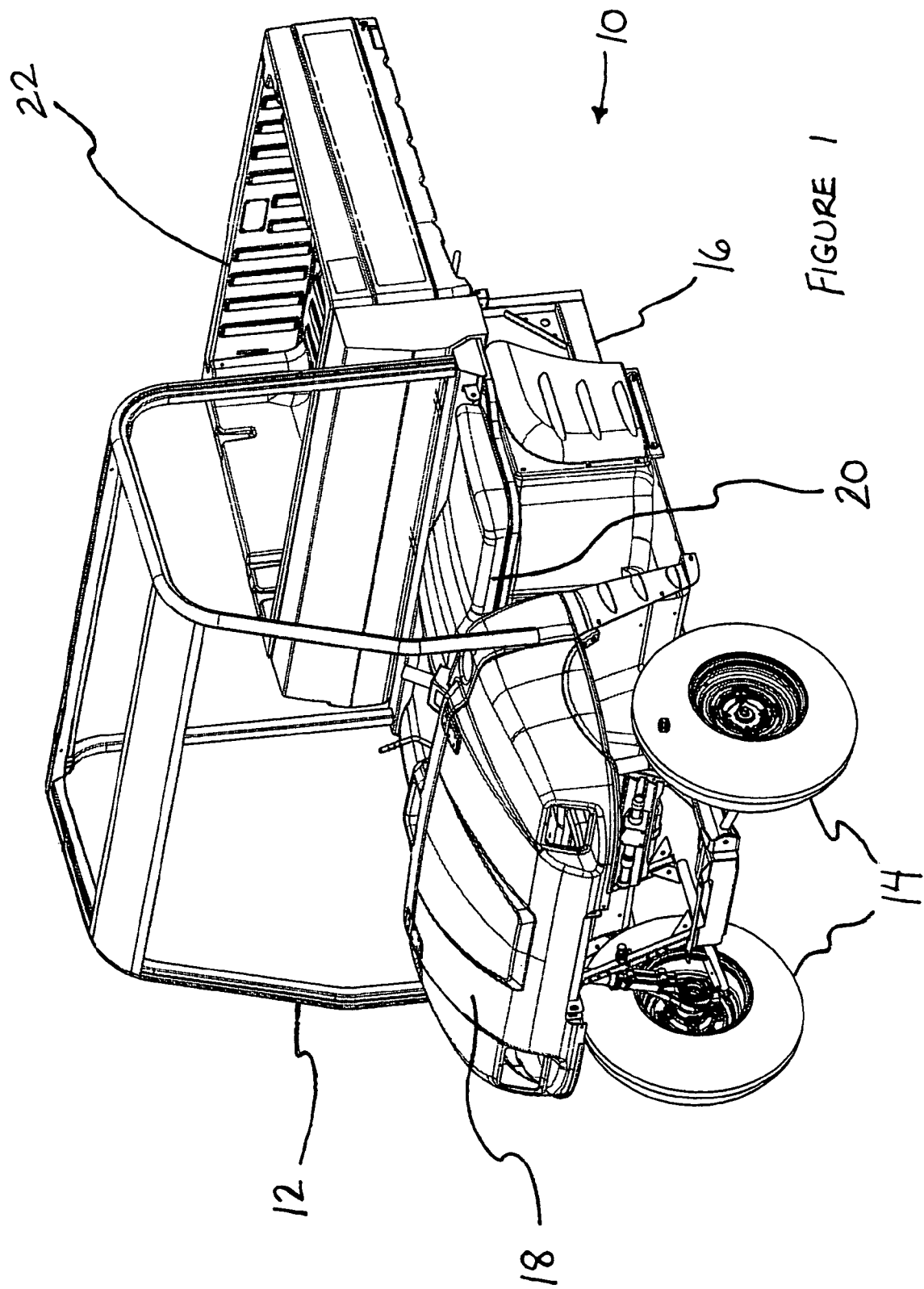
FIG. 1 is a schematic side perspective view of a vehicle portion, illustrating an overhead frame structure in accordance with certain embodiments of the invention.

The following detailed description is to be read with reference to the drawings, in which like elements in different figures have like reference numerals. The drawings, which are not necessarily to scale, depict selected embodiments, but are not intended to limit the scope of the invention. It will be understood that many of the specific details of the structure incorporating the system illustrated in the drawings could be changed or modified by one of ordinary skill in the art without departing significantly from the spirit of the invention. The structure is designed for use on utility vehicles; however, it may also be used on other vehicles such as golf carts, go-carts, all-terrain vehicles, mowing equipment, agricultural equipment, and the like.

FIG. 1 shows a side perspective view of a portion of a vehicle 10, illustrating an overhead frame structure 12 in accordance with certain embodiments of the invention. The structure 12 may be utilized for a number of different functions as mentioned above. Therefore, the structure 12 may generally be referenced as a rollover protective structure (ROPS), a falling object protective structure (FOPS), an accessory frame, a cab frame, or a combination of one or more of such. While a utility vehicle is shown in FIG. 1, as mentioned above, the vehicle 10 having such structure 12 should not be limited as such. In addition, since certain preferable embodiments involve the structure 12 generally being mounted on an upper portion of the vehicle 10, the lower back portion of the vehicle 10 has not been included in FIG. 1. In particular, the vehicle 10 does not include any rear chassis or rear wheels, however, one skilled in the art would appreciate their normal inclusion on such a vehicle, and it is not intended to limit the invention in any fashion by not illustrating such. As shown, the vehicle 10 has front wheels 14, rear wheels (not shown), a frame 16, an engine compartment 18, a driver and passenger seat 20, a loading bed 22, and the overhead frame structure 12. Preferably, the structure 12 is operatively coupled to the frame 16 of the vehicle 10. In certain embodiments, as shown, the structure 12 is positioned above the driver and passenger seat 20 such that it surrounds or contains such driver and passenger (not shown) when the vehicle 10 is occupied. Preferably, a fastener assembly (not shown) is used to secure the structure 12 to the frame 16. The fastener assembly would be used on each member of the structure 12 that makes contact with the frame 16. In certain embodiments, each fastener assembly would include at least one threaded bolt and threaded nut. However, it should be appreciated that a variety of other fastener assemblies could be used as well to secure the structure 12 to the frame 16 without departing from the spirit of the invention.

Figure 2:
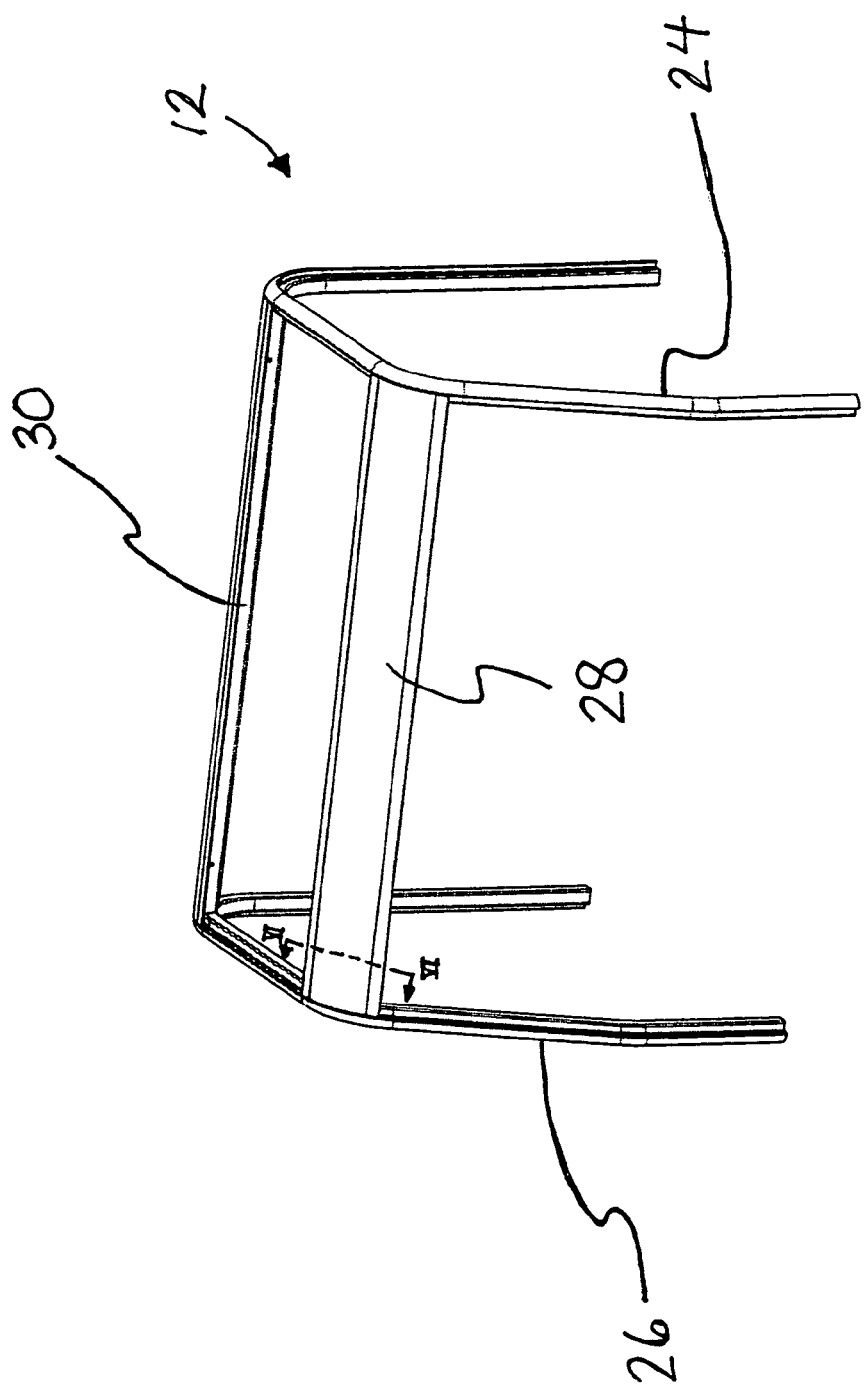
FIG. 2 is a schematic front perspective view of the overhead frame structure of FIG. 1.

FIG. 2 illustrates a front perspective view of the overhead frame structure 12 of FIG. 1. The structure 12 includes two spaced-apart, tubular side frame members 24 and 26, a front cross member 28, and a rear cross member 30. While the two side frame members 24, 26 are shown in FIG. 1 as being located on corresponding sides of the vehicle 10 such that the cross members 28, 30 extend longitudinally from one side of the vehicle 10 to the other, it is contemplated that the side frame members 24, 26 could just as well be located on other opposing portions of the vehicle 10 without departing from the spirit of the invention. For example, the side frame members 24, 26 could be located on front and rear portions of the vehicle 10 such that the cross members 28, 30 extend longitudinally from a front portion of the vehicle 10 to a back portion of the vehicle. Preferably, each of the tubular side frame members 24, 26 includes a pair of vertically extending posts. As mentioned above, the lower ends of the vertically extending posts are coupled to the frame 16 of the vehicle 10, while the upper ends of the posts have upper corner portions that each extend into a generally horizontal segment. The vertically extending posts as well as the generally horizontal segment of each side frame member 24, 26 are fabricated of steel. In certain embodiments, each of the cross members 28, 30 includes two pieces of light gauge steel sheet metal that are welded together. As will be further detailed below, each of the cross members 28, 30 is operatively coupled to the side frames 24, 26 using at least two fasteners (not shown). Preferably, the fasteners would be threaded bolts.

While certain embodiments mentioned above describe using two vertically extending posts for each side frame member, it is appreciated that other embodiments may exist that alternatively use one or more than two vertically extending posts for each side frame member. Likewise, more than one generally horizontal segment may be used, where the segments could each be positioned at the same or different heights in their coupling to the posts. Additionally, it is further contemplated that other embodiments may utilize one or more than two cross members. Also, the cross members may be secured to the side frame members in other positions besides an upper plane of the rollover protective structure. Further, it should be appreciated that the fasteners used to secure the side frame members to the cross members may include other fastener types besides threaded bolts. Finally, while certain materials are mentioned above as preferably utilized, it is contemplated that other like materials may be used instead without departing from the spirit of the invention.

Figure 3:
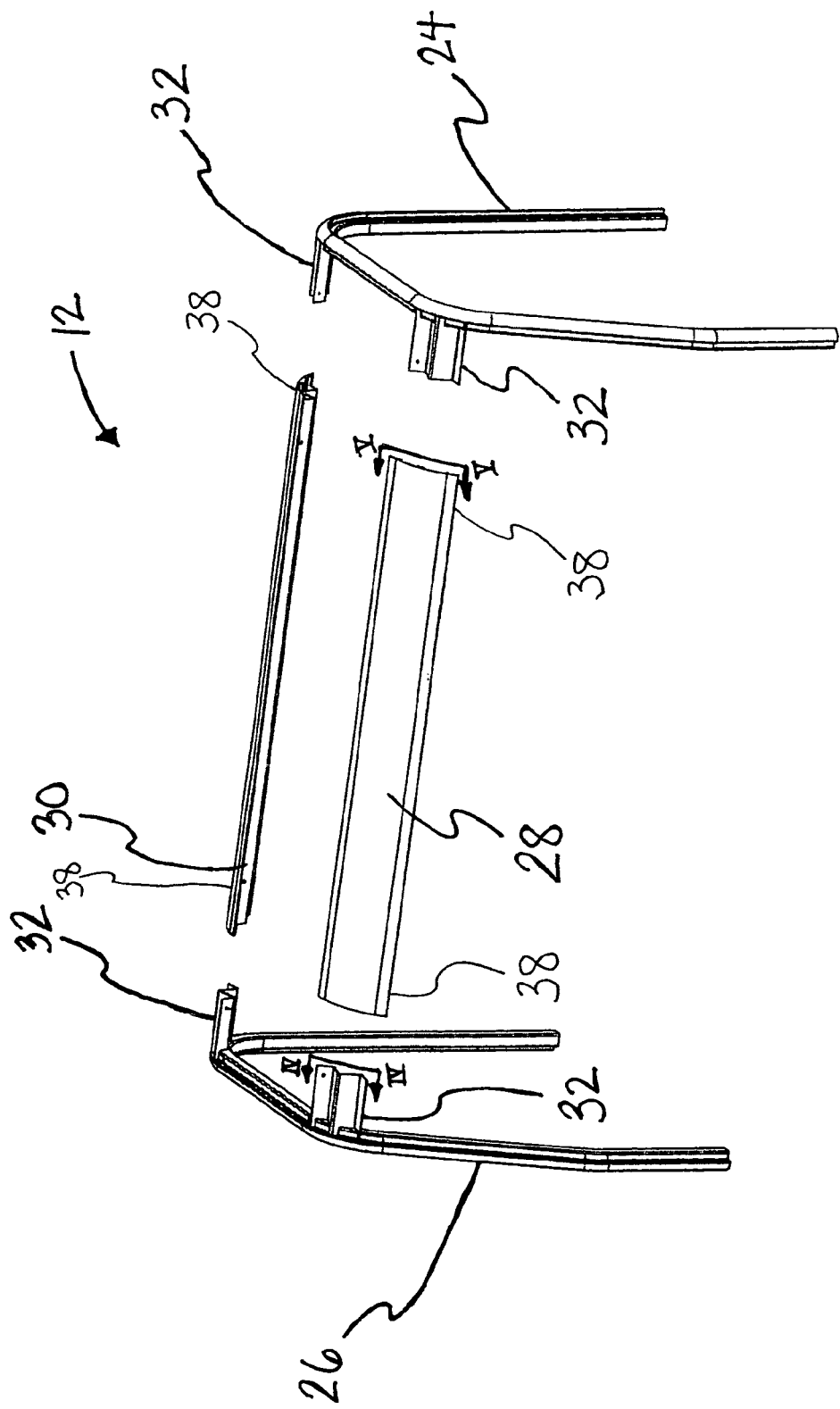
FIG. 3 is a schematic, exploded front perspective view of the overhead frame structure of FIG. 1.

FIG. 3 shows an exploded front perspective view of the overhead frame structure 12 of FIG. 1. As described above, the structure 12 includes the pair of side frame members 24, 26 and the pair of cross members 28, 30. As shown, each of the side frame members 24, 26 includes a pair of protrusions 32. Preferably, each protrusion 32 on one side frame member, e.g., 24, extends toward an opposing protrusion 32 on the other side frame member 26. While two protrusions 32 are shown on each side frame member 24, 26, it is contemplated that the number of protrusions 32 per side frame member 24, 26 may just as well be one or more than two. The number of protrusions 32 on each of the side frame members 24, 26 generally corresponds to the number of cross members used for the structure 12. The protrusions 32 collaboratively function in securing the cross members 28, 30 to the side frame members 24, 26. In certain embodiments, one or more pairs of the opposing protrusions 32 are each divided among the two side frame members 24, 26 such that the opposing protrusions 32 of any one pair engage the ends of one of the cross members 28, 30. As detailed below, when the cross members 28, 30 are coupled to the side frame members 24, 26 via the pairs of protrusions 32, the cross members 28, 30 preferably receive the protrusions 32 therein, and as such, provide an aesthetic appearance to the structure 12.

Figure 4:
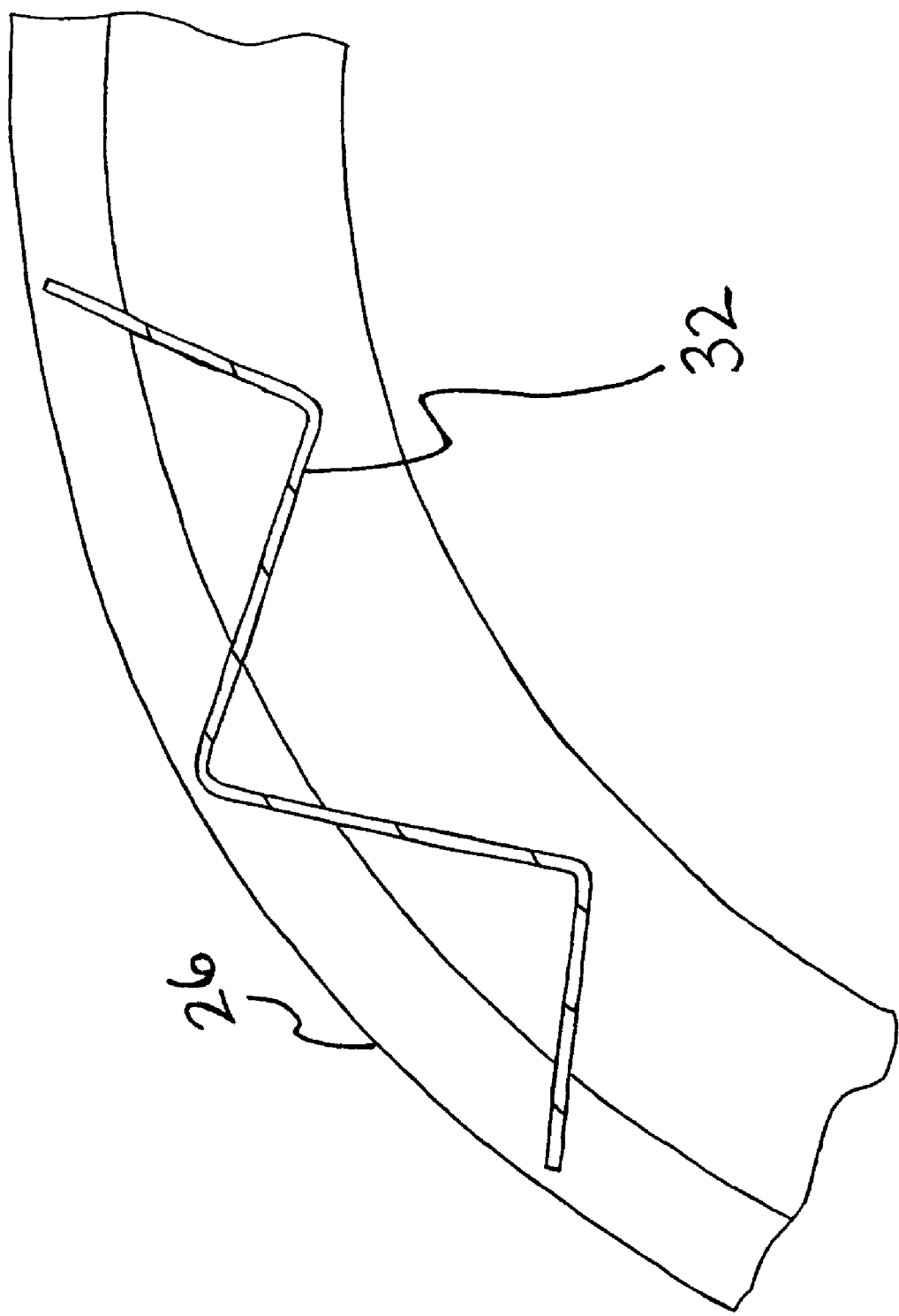
FIG. 4 is a schematic, side view of an upper corner portion of a side frame member of the overhead frame structure of FIG. 3 taken along the line IV—IV.

FIG. 4 illustrates a side view of the upper corner portion of the side frame member 26 of the overhead frame structure 12 of FIG. 3, taken along the line IV—IV. As previously described, the upper corner portions are generally located between the upper ends of the vertically extending posts and the generally horizontal segment of the side frame members 24, 26. As shown, the corner portion includes one of the protrusions 32. In certain embodiments, the protrusion 32 is generally fabricated of light gauge steel sheet metal and welded to the side frame member 26. Depending on the overall size and weight of the structure 12, the protrusion 32 could be a number of conceivable lengths. In the embodiment described and depicted herein, the protrusion 32 may be seven inches in length, however, it is appreciated that the protrusion length is variable based on a number of other factors (e.g., size and weight of structure 12, length of cross member 28, 30, etc.). Preferably, the protrusion 32 has a plurality of segments extending longitudinally thereof that are oriented in a jagged relation to each other. As such, the segments provide the protrusion 32 with a corrugated configuration. In certain embodiments, as shown, the protrusion 32 has four segments, with the segments oriented so that the protrusion 32 is shaped in the form of a "w". Preferably each of the other protrusions 32 of the structure 12 (visible in FIGS. 1 through 3) is similarly configured and attached to a corresponding portion of one of the side frame members 24, 26 as described above.

While certain embodiments mentioned above describe the protrusions 32 as being located on the corner portions of the side frame members 24 and 26, it is appreciated that other embodiments may exist in which the protrusions 32 are located on one or both of the vertically extending posts and the generally horizontal segment. Likewise, the exact orientation of the protrusions 32 on the inner surface of the side frame members 24, 26 may be modified. For example, the one or more protrusions 32 may be centered, or alternatively, located closer to the outer edge of the frame member for aesthetic purposes or additional clearance. Also, it is contemplated that embodiments may exist in which the protrusions 32 are formed having fewer than four segments in jagged orientation without departing from the spirit of the invention. Alternatively, the protrusions 32 may have more than four segments. In addition, the segments may be different lengths, so as to distribute any force applied to the protrusions 32 in different fashions. Further, it should be appreciated that the angles between adjacent segments could be increased or decreased. Finally, while a preferable embodiment is provided above in which the shape is attached to the side frame member in one vertical direction, it is contemplated that embodiments may also exist in which the shape is attached and directed in an opposite vertical direction without departing from the spirit of the invention.

Figure 5:
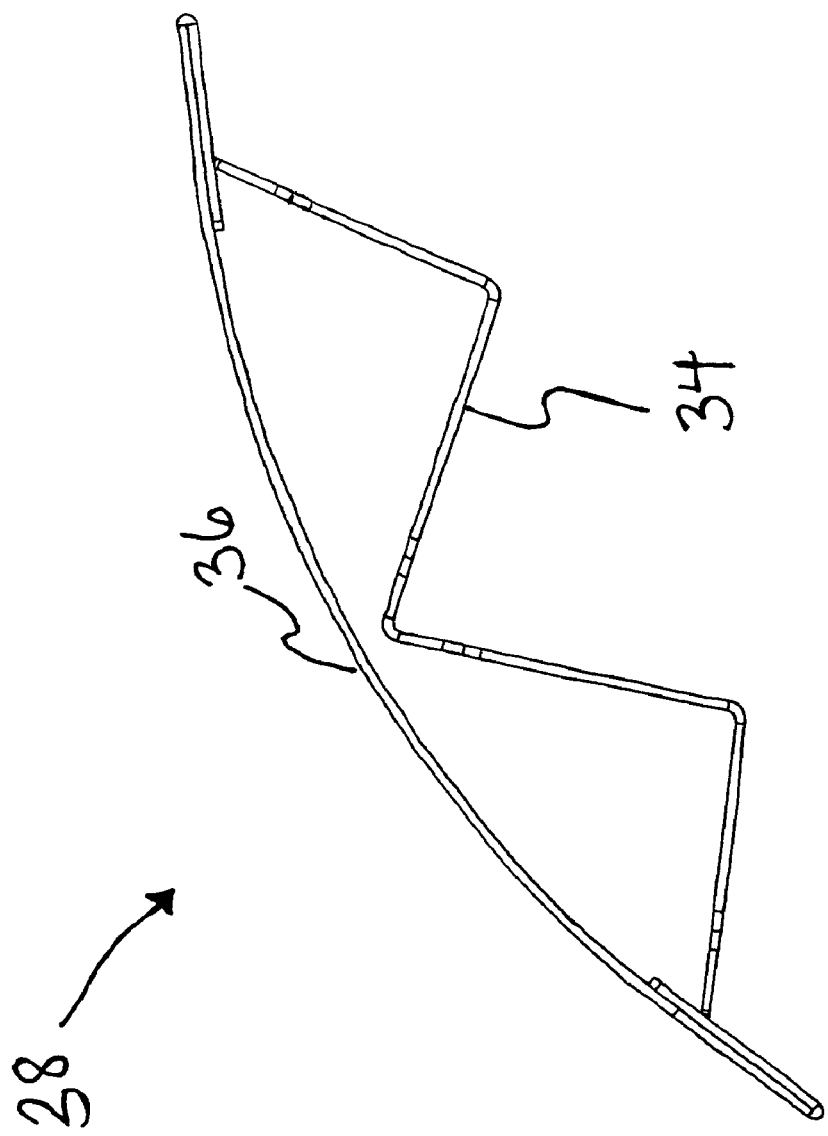
FIG. 5 is a schematic, side view of a cross member of the overhead frame structure of FIG. 3 taken along the line V—V.

FIG. 5 shows a side view of an end portion 38 of the front cross member 28 of the overhead frame structure 12 of FIG. 3, taken along the line V—V. Preferably, the end portion 38 includes a lower portion 34 and an upper portion 36. In certain embodiments, the lower and upper portions 34, 36 are separately fabricated of light gauge steel and subsequently welded together. Alternatively, it is appreciated that the end portion 38 may comprise only a solitary piece having both upper and lower portions 36, 34. Preferably, a wall of the end portion 38 has a plurality of segments extending longitudinally thereof that are oriented in a jagged relation to each other. As such, the segments provide the wall with a corrugated configuration. In certain embodiments, as shown, the wall is the lower portion 34 and has four segments, with the segments oriented so that the wall is shaped in the form of a "w". As such, the lower portion 34 is similarly shaped to the protrusions 32 described above. In turn, the lower portion 34 is adapted to engage with the protrusions 32. Preferably, the end portion 38 is appropriately sized to receive one of the protrusions 32 therein. As such, the length of the end portion 38 is preferably greater than or equal to the length of the protrusion 32 received therein. In certain embodiments, as shown, the end portions 38 may extend across the length of the cross members 28, 30 and conjoin. However, it is appreciated that the end portions 38 may also terminate at a certain length such that they do not conjoin across the length of the cross members 28, 30. Preferably, the other end portion of the front upper cross member 28 as well as the end portions 38 of the rear upper cross member 30 of the structure 12 are similarly configured as described above.

While certain embodiments mentioned above describe the cross member 28 as having a corrugated lower portion 34 and a upper portion 36 that extends about the lower portion 34, it is appreciated that other embodiments may exist where the upper portion 36 is corrugated and the lower portion 34 extends about the upper portion 36. Additionally, embodiments may exist which parallel what has already been described with respect to the protrusions 32. For example, a fewer or greater number of segments may be represented in jagged orientation, the segments may be different lengths, the angles between adjacent segments could be increased or decreased, and the segment shape may be directed in an opposite vertical direction. However, the modifications done with respect to the corrugated walls of the end portions 38 are preferably also done with respect to the corrugated protrusions 32 in order for the walls and the protrusions 32 to appropriately engage when aligned and interconnected.

Figure 6:
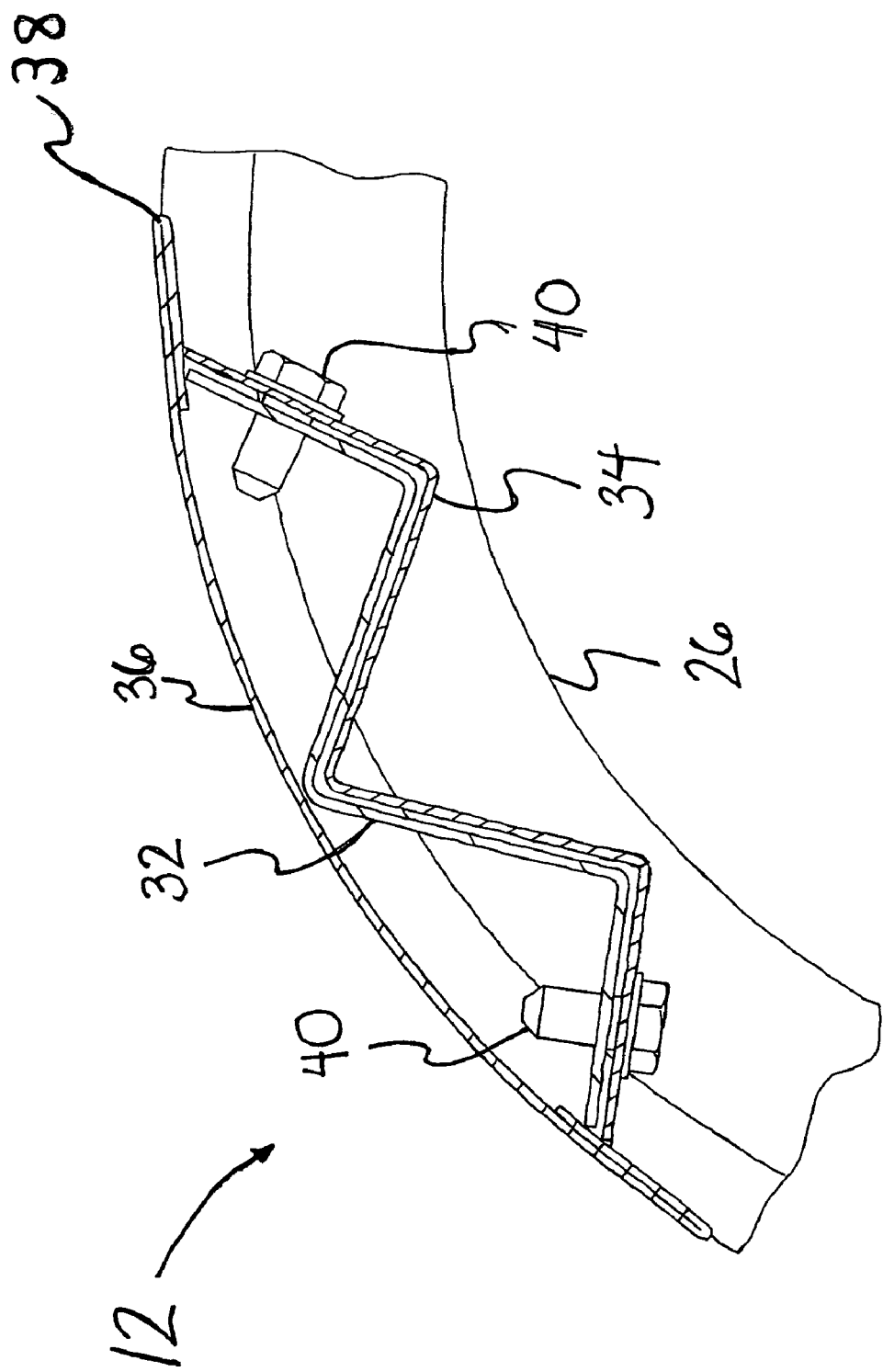
FIG. 6 is a cross-sectional side view of an upper corner portion of the overhead frame structure of FIG. 2 taken along the line VI—VI.

FIG. 6 illustrates a cross-sectional side view of an upper corner portion of the overhead frame structure 12 of FIG. 2 taken along the line VI—VI. As such, an assembly involving one of the protrusions 32 and the end portion 38 of the cross member 28 is shown. The assembly may be referred to as "hand-in-glove" as the corrugated protrusion 32 is received within the end portion 38 of the cross member 28. In certain embodiments, as shown, the protrusion 32 engages with the lower portion 34 of the cross member 28 since both the protrusion 32 and the lower portion 34 have similarly shaped longitudinal cross sections to facilitate such engagement therebetween. Preferably, once received within the cross member end portion 38 and aligned with the cross member lower portion 34, the protrusion 32 may be secured using one or more fasteners 40, as described above. Preferably, the fasteners 40 are threaded bolts and are inserted into pre-drilled and threaded apertures (not visible in FIG. 6) located in the outer segments of the protrusion 32 and the lower portion 34. The apertures properly align once the protrusion 32 is aligned with the corrugated wall of the end portion 38. As mentioned above, in certain embodiments, such wall is the lower portion 34. Preferably, a similar assembly would occur between the rear upper cross member 30 and the other protrusions 32 of the overhead frame structure 12 as described above.

While certain embodiments mentioned above describe the interconnection between the protrusions 32 of the side frame members 24, 26 and the cross members 28, 30, it is appreciated that other embodiments may exist that differ in representation without departing from the spirit of the invention. For example, as described above, if the upper portions 36 on the end portions 38 of the cross members 28, 30 were corrugated, the protrusions 32 could, in turn, engage and be secured to such upper portions 36 instead of to the lower portions 34. Another embodiment may include the protrusions 32 engaging with the end portions 38 on an outer surface thereof instead of being received therein. A further embodiment may involve the upper portion 36 of the end portion 38 being expanded in surface area to cover a larger portion of the upper plane of the overhead frame structure 12. By expanding the surface area of the upper portion 36, one of the cross members 28, 30 could be used as a roof canopy. By further expanding the surface area of the upper portion 36 and including multiple end portions 38 on a lower portion thereof, one of the cross members 28, 30 could be used as a roof for the vehicle 10.

The overhead frame structure interconnection system of the invention provides many advantages for consumers as well as manufacturers of overhead frame structure and vehicles utilizing such structures. In one embodiment detailed above, the structure 12 is generally limited to four members, the two side frame members 24, 26 and the two cross members 28, 30. As such, the assembly or disassembly of the structure 12 is relatively simple and straight-forward. Further, the members are assembled together using fasteners 40, e.g., bolts, which can be manipulated, i.e., removed or replaced, with common tools. Finally, assembly of the structure 12 requires no welding between the members. As such, the structure 12 can be assembled and disassembled a number of different times if necessary. Thus, the structure 12 is easily disassembled and removed from the vehicle 10 if necessary, for example, when shipping, storing, or repairing the structure 12.

In particular, there may be a variety of applications in which the overhead frame structure 12 may be shipped. One application may involve shipping the two side frame members and the one or more cross members after fabrication but before assembly. As such, the shipment may be sent to manufacturers of vehicles requiring the use of such structures 12. Another application may involve shipping the structure 12 after it has been assembled. As such, the structure 12 can be quickly disassembled into its corresponding separate members, generally including the two side frame members and the one or more cross members. After disassembly, the members can be shipped. With the structure 12 being disassembled into members, less volume will be needed for shipping in contrast to shipping a fully-assembled structure 12. Thus, the shipping costs would be reduced. A further application may involve shipping a vehicle utilizing the structure 12. As such, the structure 12 could be disassembled as described above and removed from the vehicle (if already mounted thereon). Subsequently, the disassembled members of the structure 12 could be shipped with the vehicle or shipped separately from the vehicle. In either scenario, less shipping volume again would be needed when shipping a structure 12 that is disassembled, thereby reducing shipping costs.

In certain embodiments, the structure 12 involves the use of light gauge fabricated steel sheet metal being interconnected between the tubular steel side frame members 24, 26. As such, fabrication costs for the structure 12 are reduced over other designs involving heavier, more expensive materials, e.g., heavy gauge rolled steel. Additionally, by using the light gauge steel instead of the heavier, more expensive materials, the design of the structure 12 can be more easily modified. For example, if the design requires relocating the protrusions 32 to different locations along the side frame members 24, 26, or requires a greater number of protrusions 32 to be added to the structure 12 to secure more cross members 28, 30 thereto, the tooling costs for making such modifications would be less expensive than if using the heavier, more expensive material. In using the light gauge steel, however, other design considerations had to be considered for its use in some applications. In particular, the integrity of the material had to be maintained in order to use the structure 12 for rollover protection applications (e.g., gross vehicle weight (GVW) of 4000 pounds) in which the heavier, more expensive materials had previously been utilized. By incorporating each of the interconnecting members (i.e., the protrusions 32 and the cross member end portions 38) with a corrugated design as detailed above, the section strength of the light gauge steel material met, if not exceeded, the standard that is required for use in these desired applications.

While embodiments of the present invention have been described, it should be understood that various changes, adaptations, and modifications may be made therein without departing from the spirit of the invention and the scope of the appended claims.

What is claimed is:

1. An overhead frame structure comprising:
   two spaced-apart side frame members, each side frame member having at least one protrusion, each protrusion on one side frame member extending toward an opposing protrusion on the other side frame member, each protrusion having segments extending longitudinally thereof, the segments providing each protrusion with a corrugated configuration;
   one or more cross members, each cross member extending between a pair of opposing protrusions, each cross member having end portions adapted for receiving said pair of opposing protrusions therein, each end portion having a wall having segments extending longitudinally thereof, the segments providing each wall with a corrugated configuration, each wall engaging one of said pair of opposing protrusions, each end portion of each cross member having a longitudinally extending upper portion and lower portion, the lower portion comprising the wall having the corrugated configuration and the upper portion extending about the lower portion; and
   fasteners releasably securing said cross member end portions to said protrusions.

2. The structure of claim 1, wherein each side frame member comprises two or more vertically extending posts each having lower ends, the lower ends adapted to couple to a frame of a vehicle.

3. The structure of claim 1, wherein each side frame member comprises two or more vertically extending posts each having an upper corner portion that extends into a generally horizontal segment.

4. The structure of claim 3, wherein at least one of the pairs of opposing protrusions is positioned on respective upper corner portions of the side frame members.

5. The structure of claim 1, wherein each of the pairs of opposing protrusions is positioned so that the protrusions align with yet oppose each other.

6. The structure of claim 1, wherein the fastener comprises a threaded bolt.

7. The structure of claim 1, wherein the protrusions of each side frame member and the walls of each end portion of each cross member have similarly shaped longitudinal cross sections.

8. The structure of claim 7, wherein the similarly shaped longitudinal cross sections each comprise two or more of the segments oriented in jagged relation to each other.

9. The structure of claim 7, wherein the similarly shaped longitudinal cross sections are each generally shaped like a "w".

10. An overhead frame structure for a vehicle comprising:
    two spaced-apart side frame members, each side frame member having at least one protrusion, each protrusion on one side frame member extending toward an opposing protrusion on the other side frame member, each protrusion having segments extending longitudinally thereof, the segments providing each protrusion with a corrugated configuration;
    one or more cross members, each cross member extending between a pair of opposing protrusions, each cross member having end portions adapted for receiving said pair of opposing protrusions therein, each end portion having a wall having segments extending longitudinally thereof, the segments providing each wall with a corrugated configuration, each wall engaging one of said pair of opposing protrusions, the protrusions of each side frame member and the walls of each end portion of each cross member have similarly shaped longitudinal cross sections; and fasteners releasably securing said cross member end portions to said protrusions.

11. The structure of claim 10, wherein the similarly shaped longitudinal cross sections each comprise two or more of the segments oriented in jagged relation to each other.

12. The structure of claim 10, wherein the similarly shaped longitudinal cross sections are each generally shaped like a "w".

13. The structure of claim 10, wherein each side frame member comprises two or more vertically extending posts each having lower ends, the lower ends adapted to couple to a frame of a vehicle.

14. The structure of claim 10, wherein each side frame member comprises two or more vertically extending posts each having an upper corner portion that extends into a generally horizontal segment.

15. The structure of claim 14, wherein at least one of the pairs of opposing protrusions is positioned on respective upper corner portions of the side frame members.

16. The structure of claim 10, wherein each of the pairs of opposing protrusions is positioned so that the protrusions align with yet oppose each other.

17. The structure of claim 10, wherein each end portion of each cross member has a longitudinally extending upper portion and lower portion, wherein the lower portion comprises the wall having the corrugated configuration and the upper portion extends about the lower portion.

18. The structure of claim 10, wherein the fastener comprises a threaded bolt.

19. The structure of claim 10, wherein the fasteners are releasable and reattachable.

20. A method of assembling an overhead frame structure for a vehicle comprising:

providing two side frame members each having at least one protrusion, each protrusion on one side frame member extending toward an opposing protrusion on the other side frame member, each protrusion having segments extending longitudinally thereof, the segments providing each protrusion with a corrugated configuration;

providing one or more cross members, each cross member having end portions adapted for receiving one pair of opposing protrusions therein, each end portion having a wall having segments extending longitudinally thereof, the segments providing each wall with a corrugated configuration, each end portion of each cross member having a longitudinally extending upper portion and lower portion, the lower portion comprising the wall having the corrugated configuration and the upper portion extending about the lower portion;

interconnecting each of the cross members with one of the pairs of opposing protrusions of the side frame members such that the protrusions are received within the end portions of the cross members and the walls of the end portions engage with the protrusions; and securing said cross member end portions to said protrusions.

21. The method of claim 20, wherein the interconnecting step comprises the steps of:

selecting one cross member for every pair of opposing protrusions;

inserting the one or more pairs of opposing protrusions into the respective end portions of the selected cross members; and aligning the protrusions with the walls of the end portions of the selected cross members for proper engagement therebetween.

22. The method of claim 20, wherein the securing step comprises providing fasteners to secure the wall of each end portion to one of the protrusions.

23. The method of claim 20, further comprising the step of coupling the structure to a frame of the vehicle.

24. A method of supplying an overhead frame structure for a vehicle comprising:

providing two side frame members each having at least one protrusion, each protrusion on one side frame member extending toward an opposing protrusion on the other side frame member, each protrusion having segments extending longitudinally thereof, the segments providing each protrusion with a corrugated configuration;

providing one or more cross members, each cross member having end portions adapted for receiving one pair of opposing protrusions therein, each end portion having a wall having segments extending longitudinally thereof, the segments providing each wall with a corrugated configuration, each end portion of each cross member having a longitudinally extending upper portion and lower portion, the lower portion comprising the wall having the corrugated configuration and the upper portion extending about the lower portion; and shipping the side frame members and the cross members.

25. The method of claim 24, further comprising the steps of:

interconnecting each of the cross members with one of the pairs of opposing protrusions of the side frame members such that the protrusions are received within the end portions of the cross members and the walls of the end portions engage with the protrusions;

securing said cross member end portions to said protrusions to form the overhead frame structure; and coupling the structure to a frame of the vehicle.

26. A method of assembling an overhead frame structure for a vehicle comprising:

providing two side frame members each having at least one protrusion, each protrusion on one side frame member extending toward an opposing protrusion on the other side frame member, each protrusion having segments extending longitudinally thereof, the segments providing each protrusion with a corrugated configuration;

providing one or more cross members, each cross member having end portions adapted for receiving one pair of opposing protrusions therein, each end portion having a wall having segments extending longitudinally thereof, the segments providing each wall with a corrugated configuration;

interconnecting each of the cross members with one of the pairs of opposing protrusions of the side frame members such that the protrusions are received within the end portions of the cross members and the walls of the end portions engage with the protrusions, the protrusions of each side frame member and the walls of each end portion of each cross member having similarly shaped longitudinal cross sections, each of the similarly shaped longitudinal cross sections generally shaped like a "w"; and securing said cross member end portions to said protrusions with fasteners that are releasable and reattachable.

27. The method of claim 26, wherein the interconnecting step comprises the steps of:
   selecting one cross member for every pair of opposing protrusions;
   inserting the one or more pairs of opposing protrusions into the respective end portions of the selected cross members; and
   aligning the protrusions with the walls of the end portions of the selected cross members for proper engagement therebetween.

28. The method of claim 26, wherein the securing step comprises providing the fasteners to secure the wall of each end portion to one of the protrusions.

29. The method of claim 26, further comprising the step of coupling the structure to a frame of the vehicle.

30. The method of claim 26, wherein the securing step comprises fastening outer segments of said cross member end portions to outer segments of said protrusions.

* * * * *